United States Patent
Wang et al.

(10) Patent No.: US 9,207,396 B2
(45) Date of Patent: Dec. 8, 2015

(54) SINGLE MODE OPTICAL FIBER WITH LARGE EFFECTIVE AREA

(71) Applicant: YANGTZE OPTICAL FIBRE AND CABLE JOINT STOCK LIMITED COMPANY, Wuhan, Hubei (CN)

(72) Inventors: Runhan Wang, Hubei (CN); Shengya Long, Hubei (CN); Mengxun Sun, Hubei (CN); Hongyan Zhou, Hubei (CN); Mingfeng Mao, Hubei (CN); Zhiyong Wang, Hubei (CN)

(73) Assignee: YANGTZE OPTICAL FIBRE AND CABLE JOINT STOCK LIMITED COMPANY, Wuhan, Hubei (CN)

( * ) Notice: Subject to any disclaimer, the term of this patent is extended or adjusted under 35 U.S.C. 154(b) by 0 days.

(21) Appl. No.: 14/439,199

(22) PCT Filed: Jul. 3, 2013

(86) PCT No.: PCT/CN2013/078724
§ 371 (c)(1),
(2) Date: Apr. 28, 2015

(87) PCT Pub. No.: WO2014/067292
PCT Pub. Date: May 8, 2014

(65) Prior Publication Data
US 2015/0301276 A1    Oct. 22, 2015

(30) Foreign Application Priority Data
Oct. 30, 2012    (CN) .......................... 2012 1 0423426

(51) Int. Cl.
  *G02B 6/36* (2006.01)
  *G02B 6/036* (2006.01)
  *G02B 6/02* (2006.01)

(52) U.S. Cl.
  CPC ............ *G02B 6/036* (2013.01); *G02B 6/02009* (2013.01); *G02B 6/02019* (2013.01); *G02B 6/0228* (2013.01); *G02B 6/03605* (2013.01)

(58) Field of Classification Search
None
See application file for complete search history.

(56) References Cited

U.S. PATENT DOCUMENTS

| 4,723,828 A | * | 2/1988 | Garel-Jones | ....... G02B 6/02285 |
| | | | | 359/900 |
| 6,434,311 B1 | * | 8/2002 | Danziger | ........... G02B 6/02023 |
| | | | | 385/123 |

(Continued)

FOREIGN PATENT DOCUMENTS

| CN | 1306628 A | 8/2001 |
| CN | 1624506 A | 6/2005 |
| CN | 102313924 A | 1/2012 |
| CN | 102944910 A | 2/2013 |
| JP | 08248251 A | 9/1996 |

OTHER PUBLICATIONS

International Search Report issued by State Intellectual Property Office of the P.R. China dated Oct. 17, 2013 for Application No. PCT/CN2013/0078724.

*Primary Examiner* — Ryan Lepisto
*Assistant Examiner* — Erin Chiem
(74) *Attorney, Agent, or Firm* — Tin Tingkang Xia, Esq.; Locke Lord LLP

(57) ABSTRACT

A single-mode fiber with a large effective area comprises a core layer and a cladding layer. The core layer is cladded with an intermediate cladding layer, and a depressed cladding layer is provided outside the intermediate cladding layer. The core layer comprises a first fiber sub core layer having a radius $r_1$ of 1.5-5 μm and a relative refractive index difference $\Delta n_1$ of 0.05-0.22%, and a second sub core layer having a unilateral radial width $(r_2-r_1)$ of 1.5-5 μm and a relative refractive index difference $\Delta n_2$ of 0.15-0.34%, where $\Delta n_1$ is less than $\Delta n_2$. Accordingly, the optical fiber can reach an effective area equal to or greater than 120 μm² when the related parameters thereof are optimized.

14 Claims, 1 Drawing Sheet

(56) References Cited

U.S. PATENT DOCUMENTS 6,522,821 B1    2/2003   Hirano et al.
7,400,807 B2 *   7/2008   Minelly .............. G02B 6/03605
                                                        359/341.1
2003/0180020 A1 *   9/2003   Beaumont .......... G02B 6/02009
                                                          385/127
2014/0093205 A1 *   4/2014   Gruner-Nielsen ... G02B 6/0288
                                                             385/43

* cited by examiner

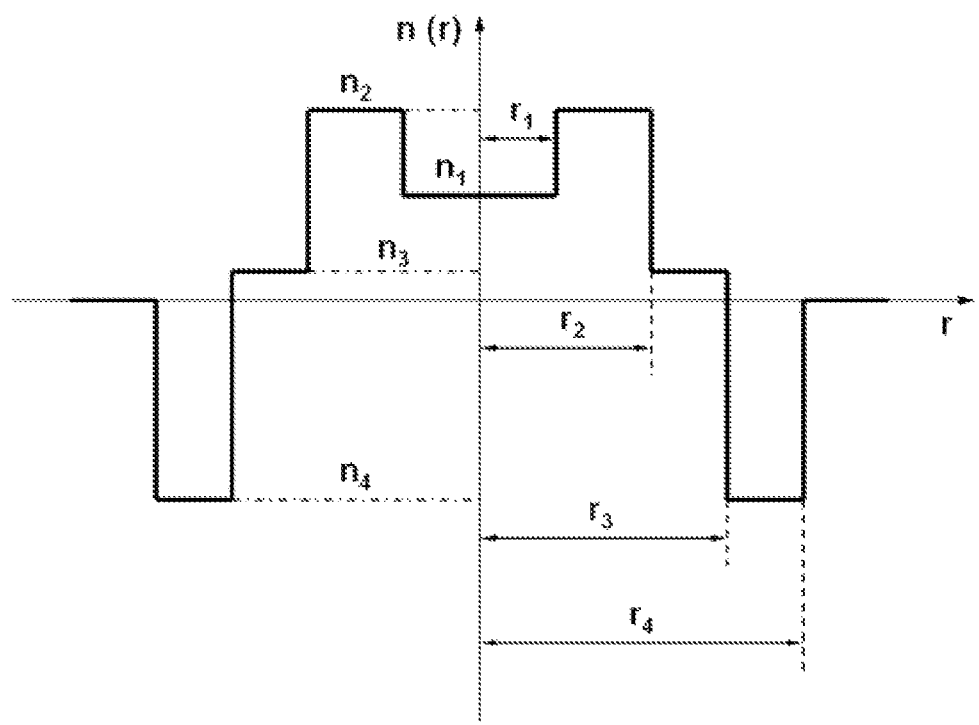

SINGLE MODE OPTICAL FIBER WITH LARGE EFFECTIVE AREA

FIELD OF THE INVENTION

The present invention relates to a single-mode optical fiber. Said optical fiber, with a relatively lower cable cutoff wavelength, a better bending performance, and a larger effective area, is applicable for transmission systems of large capacity, high speed, and long distance.

BACKGROUND OF THE INVENTION

With the continuous development of optical fiber transmission technology, the Erbium-Doped Fiber Amplifier (EDFA) and Wavelength Division Multiplexing (WDM) technology have been used since the mid-1990's. In a WDM system, since the insertion loss brought about by the multiplexer and de-multiplexer used therein is relatively high, amplification and compensation are generally performed by EDFA. However, when the optical power is amplified, the nonlinear effects in the optical fiber are increased greatly. The nonlinear effects comprise four-wave mixing, self-phase modulation, cross-phase modulation, etc, which would restrict the capacity and distance of the optical transmission. Hence, in the transmission systems of large capacity and high speed, a higher requirement on the performance of the transmission fiber is put forward. The nonlinear effects in the optical fiber can be reduced through improving the performance of the optical fiber.

When a system with a high power density is used, the nonlinear coefficient is used to evaluate the effects on the performance of the system brought about by the nonlinear effects. The nonlinear coefficient is defined as $n2/A_{eff}$, wherein n2 is the nonlinear refractive index of the transmission fiber, and $A_{eff}$ is the effective area of the transmission fiber. It can be seen that, the nonlinear effects in the optical fiber can be reduced through improving the effective area thereof.

The effective area of the optical fiber is associated with the mode field distribution thereof. According to the G.650.2 standard formulated by the International Telecommunication Union Telecommunication Standardization Sector (ITU-T), the empirical formula of the relation between the effective area of the optical fiber and the mode field distribution thereof is expressed as:

$$A_{eff}=k\pi w^2 \qquad (1),$$

wherein k is a correction factor, which is different for the optical fiber with different refractive index profiles. In the above formula (1), $$w = \frac{MFD}{2},$$

wherein MFD is the mode field diameter of the optical fiber. It can be easily seen that, if MFD is increased when the optical fiber is designed, the $A_{eff}$ thereof can be enlarged accordingly. It is known by a person skilled in the art that, the MFD of the optical fiber can be increased through regulating the refractive index of the core layer and the core diameter thereof. However, the increasing of the MFD of the optical fiber would adversely affect other performances of the optical fiber, such as the cutoff wavelength and the bending performance.

Theoretically, the bending performance of the optical fiber depends directly as the value of MAC thereof. That is to say, the larger the value of MAC is, the poorer the bending performance will be. The value of MAC is the ratio of the mode field diameter of the transmission fiber to the cutoff wavelength thereof. In order to guarantee a single-mode transmission in the optical fiber with a large effective area within the application wavelength window, the cutoff wavelength cannot be too high. For example, according to the G.654 standard formulated by ITU-T, the cable cutoff wavelength is suggested not to surpass 1530 nm. Hence, since the cutoff wavelength is limited in a certain numerical scope, the increasing of MFD would increase the value of MAC inevitably. In this case, the bending performance of the optical fiber is adversely affected. Therefore, as to the designing of optical fiber with a large effective area, the key lies in the balance among respective parameters thereof, so that a reasonable compromise among the performances of the optical fiber can be obtained.

An optical fiber with an effective area larger than 150 µm² is proposed by Chinese patent No. 102313924 A. In the optical fiber according to the patent, a depressed cladding layer is added outside the cladding layer to inhibit the deterioration of the bending performance thereof. The improvement of the bending performance of the optical fiber is dependent on the volume of the depressed cladding layer. The larger the effective area of the optical fiber is, the larger the volume of the depressed cladding layer will be. The disadvantage of the above method lies in that the increasing of the volume of the depressed cladding layer would increase the cutoff wavelength thereof. Therefore, in order to obtain a larger effective area, the restriction on the cutoff wavelength is relaxed in the above patent. In its embodiments, the cutoff wavelength of many samples surpasses 1530 nm, or even reaches 1800 nm and more. Evidently, the optical fiber cannot totally satisfy the wide application at a wavelength of 1550 nm.

The electric field density distribution of the light transmitting in the optical fiber can be changed through adding a depressed structure to the core layer of the optical fiber. In this case, the distribution curve will become flatter. This means that, with reasonable design, the optical fiber with a depressed structure at its core layer could have a larger effective area compared with the ordinary optical fiber with a step profile on the premise of their respective mode field diameters are the same with each other. It can be understood that, in the above formula (1), the optical fiber with a depressed structure at its core layer would have a larger value of k. Then, under the circumstances of the increasing of MFD is limited, the structure would facilitate the further improving of the effective area thereof. A non-zero dispersion-shifted optical fiber with a depressed core layer is proposed by "*Non-zero dispersion-shifted optical fiber with ultra-large effective area and low dispersion slope for terabit communication system*" (*Optics Communication* 236 (2004) P69-74). It is described in the paper that, the electric field strength distribution of the optical fiber with a depressed core layer is different from that of the traditional non-zero dispersion-shifted optical fiber with a step profile, and the difference is considered to be the main reason of the significant improving of the effective area of the former optical fiber.

An optical fiber with a large effective area is proposed by U.S. Pat. No. 6,904,218 B2. Said optical fiber comprises a core layer, a depressed layer, and a cladding layer. In one of its embodiments, an optical fiber having a parabola-shaped sectional profile of refractive index at its core layer is proposed. On this basis, a certain change is performed. That is, the parabola, i.e., the sectional profile of refractive index of the core layer, is made to deviate from the central axis of the core layer. The changed sectional profile has a certain effect on improving the effective area of the optical fiber. However, in the embodiments of said patent, the effective area of the optical fiber at a wavelength of 1550 nm is only 131.2 µm².

Therefore, as to the designing of the optical fiber with large effective area, the challenge is to obtain a desirable compromise among its performances, such as the cutoff wavelength, the bending performance and the like, through a reasonable designing of the sectional profile of the optical fiber. In this manner, the effective area of the transmission fiber can be improved as much as possible, and the nonlinear effects thereof can be reduced, so that the optical fiber can be widely used in the transmission systems of large capacity and high speed.

Some of the terms in the present invention are defined and explained hereinafter. According to the different refractive indexes, the layer which is the nearest to the central axis of the core layer of the optical fiber is defined as the first sub core layer, and the outmost layer of the optical fiber, i.e., the pure silicon dioxide layer, is defined as the cladding layer of the optical fiber. From the first sub core layer to the cladding layer of the optical fiber, there are the first sub core layer, the second sub core layer, and so on, in sequence.

The relative refractive index difference $\Delta n_i$ of each layer of the optical fiber is defined as:

$$\Delta n_i = \frac{n_i - n_c}{n_c} \times 100\%,$$

wherein $n_i$ is the refractive index of each layer of the optical fiber, and $n_c$ is the refractive index of the cladding layer, i.e., the refractive index of pure silicon dioxide.

The effective area $A_{eff}$ of the optical fiber is defined as:

$$A_{eff} = 2\pi \frac{\left(\int_0^\infty E^2 r \, dr\right)^2}{\int_0^\infty E^4 r \, dr},$$

wherein E is the electric field relating to transmission, and r is the distance from the central axis of the optical fiber to the distribution points of the electric field.

It is defined in the 60793-1-44 standard formulated by the International Electrotechnical Commission (IEC) that, the cable cutoff wavelength is the wavelength when the optical signal does not transmit as a single-mode signal any more after transmitting 22 meters in the optical fiber. In test, one turn of the optical fiber with a bending radius of 14 cm and two turns of the optical fiber with a bending radius of 4 cm shall be made to obtain the data.

SUMMARY OF THE INVENTION

The technical problem to be solved by the present invention is to provide an optical fiber with a large effective area. A larger effective area of the optical fiber can be obtained through reasonable designing the sectional profile of the refractive index of the optical fiber. In this case, a good compromise between the cutoff wavelength and the bending performance can be obtained.

In order to solve the aforesaid problem, the present invention provides an optical fiber, comprising a core layer and a cladding layer, wherein said core layer is clad with an intermediate cladding layer, and a depressed cladding layer is provided outside said intermediate cladding layer; said core layer comprises a first sub core layer and a second sub core layer; a radius $r_1$ of said first sub core layer ranges from 1.5 µm to 5 µm, and a relative refractive index difference $\Delta n_1$ thereof ranges from 0.05% to 0.22%; a unilateral radial width $(r_2-r_1)$ of said second sub core layer ranges from 1.5 µm to 5 µm, and a relative refractive index difference $\Delta n_2$ thereof ranges from 0.15% to 0.34%; the relative refractive index difference $\Delta n_1$ of said first sub core layer is less than the relative refractive index difference $\Delta n_2$ of said second sub core layer, i.e., $\Delta n_1 < \Delta n_2$; a unilateral radial width $(r_3-r_2)$ of said intermediate cladding layer ranges from 2.5 µm to 6 µm, and a relative refractive index difference $\Delta n_3$ thereof ranges from $-0.10\%$ to $0.10\%$; and a unilateral radial width $(r_4-r_3)$ of said depressed cladding layer ranges from 2.5 µm to 10 µm, and a relative refractive index difference $\Delta n_4$ thereof ranges from $-1.5\%$ to $-0.2\%$.

According to the above technical solution, said cladding layer is a pure silicon dioxide layer.

According to the above technical solution, the radius $r_1$ of said first sub core layer preferably ranges from 2.5 µm to 4 µm.

According to the above technical solution, the unilateral radial width $(r_2-r_1)$ of said second sub core layer preferably ranges from 2 µm to 4.5 µm, and more preferably ranges from 2.5 µm to 4 µm.

According to the above technical solution, an effective area of said optical fiber at a wavelength of 1550 nm ranges from 120 µm² to 150 µm², and preferably ranges from 150 µm² to 180 µm².

According to the above technical solution, a cable cutoff wavelength of said optical fiber is less than or equal to 1530 nm.

According to the above technical solution, at a wavelength of 1550 nm, a dispersion of said optical fiber is less than or equal to 22 ps/nm*km, and a dispersion slope thereof is less than or equal to 0.070 ps/nm²*km.

According to the above technical solution, at a wavelength of 1625 nm, a bending attenuation of said optical fiber with a bending radius of 30 mm is less than or equal to 0.05 dB.

According to the above technical solution, an outer diameter of the uncoated bare fiber is 125 µm.

The following beneficial effects can be brought about by the present invention. First, the density of the electric field generated by the light transmitting in the optical fiber can be distributed flatter through providing a depressed layer in the core layer of the optical fiber, whereby the effective area of the optical fiber can be further improved. The optical fiber manufactured in this way has an effective area equal to or larger than 120 µm². The effective area equal to or larger than 150 µm² can even be obtained when the related parameters thereof are optimized. If the optical fiber has a relatively large effective area, the nonlinear effects thereof can be reduced effectively. Second, according to the present invention, the cutoff wavelength, bending loss, dispersion and other comprehensive performance parameters of the optical fiber are all desirable in the application wave band. The cutoff wavelength of the cable made of said optical fiber is small enough, so that a single-mode state of the optical signal can be ensured when the optical fiber is used during transmission application. Third, the optical fiber has a relatively large effective area, as well as a relatively low bending attenuation at the same time. Last, the optical fiber of the present invention is applicable for transmission systems of high speed, large capacity, and long distance, as well as long distance transmission systems without relay.

BRIEF DESCRIPTION OF THE DRAWINGS

FIG. 1 schematically shows a sectional profile of refractive index of each layer of an optical fiber according to the present invention.

DETAILED DESCRIPTION OF THE EMBODIMENTS

The present invention will be further illustrated hereinafter with reference to the embodiments. The optical fiber according to the present invention comprises a core layer, a cladding layer, and an outer cladding layer. The core layer comprises a first sub core layer and a second sub core layer, and the cladding layer comprises an intermediate cladding layer and a depressed cladding layer. There are the first sub core layer, the second sub core layer, the intermediate cladding layer, the depressed cladding layer, and the outer cladding layer from inside to outside in sequence. A radius of said first sub core layer is $r_1$, and a relative refractive index difference thereof is $\Delta n_1$; a radius of said second sub core layer is $r_2$, and a relative refractive index difference thereof is $\Delta n_2$; a radius of said intermediate cladding layer is $r_3$, and a relative refractive index difference thereof is $\Delta n_3$; and a radius of said depressed cladding layer is $r_4$, and a relative refractive index difference thereof is $\Delta n_4$. The outer cladding layer is a pure silicon dioxide layer.

It can be understood by a person skilled in the art that, a preform of the optical fiber, which conforms to the sectional profile of the refractive index of the optical fiber of the present invention, can be manufactured through known core rod manufacturing technologies without departing from the scope of the present invention, such as Plasma Chemical Vapor Deposition (PCVD) technology, Modified Chemical Vapor Deposition (MCVD) technology, Outside Vapor Deposition (OVD) technology, Vapor phase Axial Deposition (VAD) technology, and Advanced Plasma Vapor Deposition (APVD) technology, etc. Then, the preform is made into optical fiber through stretching technology or drawing technology. Different kinds of doped materials can be used in the present invention to realize the distribution shape of the refractive index thereof, such as Ge-doped material, F-doped material, and Ge—F co-doped material.

The sectional parameters of the optical fiber according to the embodiments of the present invention are shown in Table 1, and the performance parameters of the optical fiber samples as shown in Table 1 are shown in Table 2.

TABLE 1

The sectional parameters of the optical fiber according to the embodiments of the present invention

| Sectional parameters | $\Delta n_1$ % | $\Delta n_2$ % | $\Delta n_3$ % | $\Delta n_4$ % | $r_1$ μm | $r_2$ μm | $r_3$ μm | $r_4$ μm | $r_2 - r_1$ μm | $r_3 - r_2$ μm | $r_4 - r_3$ μm |
|---|---|---|---|---|---|---|---|---|---|---|---|
| 1 | 0.165 | 0.271 | 0.05 | −0.42 | 3.07 | 5.87 | 10.39 | 14.08 | 2.80 | 4.52 | 3.69 |
| 2 | 0.182 | 0.260 | 0 | −0.60 | 3.50 | 6.35 | 10.77 | 18.97 | 2.85 | 4.42 | 8.20 |
| 3 | 0.135 | 0.023 | 0.06 | −0.50 | 3.18 | 6.30 | 9.17 | 16.73 | 3.12 | 2.87 | 7.56 |
| 4 | 0.110 | 0.185 | −0.02 | −0.80 | 1.55 | 6.38 | 9.91 | 14.20 | 4.83 | 3.53 | 4.29 |
| 5 | 0.212 | 0.280 | −0.01 | −0.95 | 5.00 | 7.22 | 11.48 | 16.40 | 2.12 | 4.26 | 4.92 |
| 6 | 0.152 | 0.322 | −0.05 | −0.60 | 3.36 | 6.61 | 9.40 | 12.84 | 3.25 | 2.79 | 3.44 |
| 7 | 0.105 | 0.180 | −0.04 | −1.30 | 3.84 | 7.80 | 12.04 | 15.66 | 3.96 | 4.24 | 3.62 |
| 8 | 0.142 | 0.214 | 0.03 | −0.35 | 2.5 | 6.30 | 10.65 | 19.77 | 3.8 | 4.35 | 9.12 |

TABLE 2

The performance parameters of the optical fiber according to the embodiments of the present invention

| Performance parameters | MFD μm | $A_{eff}$ μm² | $\lambda_{cc}$ nm | D ps/nm * km | Ds ps/nm² * km | Att dB/km | B dB |
|---|---|---|---|---|---|---|---|
| 1 | 13.1 | 154 | 1472 | 20.8 | 0.065 | 0.182 | 0.04 |
| 2 | 12.4 | 138 | 1409 | 19.6 | 0.062 | 0.181 | 0.01 |
| 3 | 12.8 | 147 | 1457 | 20.8 | 0.068 | 0.183 | 0.02 |
| 4 | 13.6 | 157 | 1435 | 20.9 | 0.058 | 0.182 | 0.02 |
| 5 | 12.7 | 149 | 1443 | 21.4 | 0.064 | 0.183 | 0.01 |
| 6 | 12.3 | 132 | 1332 | 20.5 | 0.060 | 0.185 | 0.05 |
| 7 | 14.4 | 179 | 1517 | 21.6 | 0.066 | 0.184 | 0.02 |
| 8 | 13.7 | 163 | 1486 | 19.4 | 0.058 | 0.183 | 0.03 | wherein MFD is the mode field diameter of the optical fiber at a wavelength of 1550 nm, $A_{eff}$ is the effective area of the optical fiber at a wavelength of 1550 nm, $\lambda_{cc}$ is the cable cutoff wavelength, D is the dispersion of the optical fiber at a wavelength of 1550 nm, Ds is the dispersion slope of the optical fiber at a wavelength of 1550 nm, Att is the attenuation of the optical fiber at a wavelength of 1550 nm, and B is the macro-bending attenuation of the optical fiber at a wavelength of 1625 nm. In the present invention, the macro-bending attenuation of the optical fiber is the additional attenuation measured when the optical fiber circles 100 turns around a cylinder with a diameter of 60 mm.

The invention claimed is:

1. An optical fiber with a large effective area, comprising a core layer and a cladding layer, wherein
    said core layer is clad with an intermediate cladding layer, and a depressed cladding layer is provided outside said intermediate cladding layer;
    said core layer comprises a first sub core layer and a second sub core layer;
    a radius $r_1$ of said first sub core layer ranges from 1.5 μm to 5 μm, and a relative refractive index difference $\Delta n_1$ thereof ranges from 0.05% to 0.22%;
    a unilateral radial width ($r_2 - r_1$) of said second sub core layer ranges from 1.5 μm to 5 μm, and a relative refractive index difference $\Delta n_2$ thereof ranges from 0.15% to 0.34%;
    the relative refractive index difference $\Delta n_1$ of said first sub core layer is less than the relative refractive index difference $\Delta n_2$ of said second sub core layer, i.e., $\Delta n_1 < \Delta n_2$;

a unilateral radial width ($r_3-r_2$) of said intermediate cladding layer ranges from 2.5 μm to 6 μm, and a relative refractive index difference $\Delta n_3$ thereof ranges from −0.10% to 0.10%; and a unilateral radial width ($r_4-r_3$) of said depressed cladding layer ranges from 2.5 μm to 10 μm, and a relative refractive index difference $\Delta n_4$ thereof ranges from −1.5% to −0.2%.

2. The optical fiber according to claim 1, wherein said cladding layer is a pure silicon dioxide layer.

3. The optical fiber according to claim 2, wherein the radius $r_1$ of said first sub core layer ranges from 2.5 μm to 4 μm.

4. The optical fiber according to claim 3, wherein the unilateral radial width ($r_2-r_1$) of said second sub core layer ranges from 2 μm to 4.5 μm.

5. The optical fiber according to claim 2, wherein an effective area of said optical fiber at a wavelength of 1550 nm ranges from 120 μm² to 150 μm².

6. The optical fiber according to claim 2, wherein a cable cutoff wavelength is less than or equal to 1530 nm.

7. The optical fiber according to claim 2, wherein at a wavelength of 1550 nm, a dispersion of said optical fiber is less than or equal to 22 ps/nm*km, and a dispersion slope thereof is less than or equal to 0.070 ps/nm²*km.

8. The optical fiber according to claim 2, wherein at a wavelength of 1625 nm, a bending attenuation of said optical fiber with a bending radius of 30 mm is less than or equal to 0.05 dB.

9. The optical fiber according to claim 1, wherein the radius $r_1$ of said first sub core layer ranges from 2.5 μm to 4 μm.

10. The optical fiber according to claim 9, wherein the unilateral radial width ($r_2-r_1$) of said second sub core layer ranges from 2 μm to 4.5 μm.

11. The optical fiber according to claim 1, wherein an effective area of said optical fiber at a wavelength of 1550 nm ranges from 120 μm² to 150 μm².

12. The optical fiber according to claim 1, wherein a cable cutoff wavelength is less than or equal to 1530 nm.

13. The optical fiber according to claim 1, wherein at a wavelength of 1550 nm, a dispersion of said optical fiber is less than or equal to 22 ps/nm*km, and a dispersion slope thereof is less than or equal to 0.070 ps/nm²*km.

14. The optical fiber according to claim 1, wherein at a wavelength of 1625 nm, a bending attenuation of said optical fiber with a bending radius of 30 mm is less than or equal to 0.05 dB.

* * * * *